(12) United States Patent
Martinez Treviño et al.

(10) Patent No.: US 10,743,576 B2
(45) Date of Patent: Aug. 18, 2020

(54) CITRUS FRUIT JUICE EXTRACTOR

(71) Applicant: YUSY INC, S.A. DE C.V., San Pedro Garza García (MX)

(72) Inventors: Alejandro Roberto Martinez Treviño, Nuevo León (MX); Jorge Alberto De La Garza Gonzalez, Nuevo León (MX)

(73) Assignee: YUSY INC, S.A. DE C.V., San Pedro Garza Garcia (MX)

( * ) Notice: Subject to any disclaimer, the term of this patent is extended or adjusted under 35 U.S.C. 154(b) by 190 days.

(21) Appl. No.: 16/076,323

(22) PCT Filed: Feb. 8, 2016

(86) PCT No.: PCT/MX2016/000010
§ 371 (c)(1),
(2) Date: Aug. 8, 2018

(87) PCT Pub. No.: WO2017/138804
PCT Pub. Date: Aug. 17, 2017

(65) Prior Publication Data
US 2019/0045829 A1    Feb. 14, 2019

(51) Int. Cl.
*A23N 1/02* (2006.01)
*A47J 19/02* (2006.01)
*A23N 1/00* (2006.01)

(52) U.S. Cl.
CPC ............... *A23N 1/02* (2013.01); *A23N 1/003* (2013.01); *A47J 19/023* (2018.08)

(58) Field of Classification Search
CPC .......... A23N 1/02; A23N 1/003; A47J 19/023
USPC ............................ 219/494; 99/509, 510, 511
See application file for complete search history.

(56) References Cited

U.S. PATENT DOCUMENTS

| | | | |
|---|---|---|---|
| 3,866,528 A | 2/1975 | Montagroni | |
| 4,183,293 A * | 1/1980 | Arao ..................... | A47J 19/027 99/512 |
| 4,917,007 A | 4/1990 | Nelson | |
| 2009/0092721 A1* | 4/2009 | Dravitzki ............... | A23N 1/003 426/489 |
| 2011/0083565 A1* | 4/2011 | Backus .................. | A47J 19/027 99/511 |

FOREIGN PATENT DOCUMENTS

| | | |
|---|---|---|
| ES | 2130077 A1 | 6/1999 |
| ES | 2170602 A1 | 8/2002 |
| FR | 2912631 A1 | 8/2008 |

* cited by examiner

*Primary Examiner* — Mark H Paschall
(74) *Attorney, Agent, or Firm* — Mark M. Friedman

(57) ABSTRACT

The invention relates to a citrus fruit juice extractor which can be used to cut citrus fruits into at least two parts, extract the juice therefrom and discharge the peel following juicing. The juice extractor consists of a juice extractor element coupled in a hollow housing having openings in the sides thereof, a cutting element connected above the extractor element, and press means located above the hollow housing.

16 Claims, 6 Drawing Sheets

CITRUS FRUIT JUICE EXTRACTOR

FIELD OF THE INVENTION

The present invention relates to a citrus fruit juicer and more specifically to a citrus fruit juicer extractor for producing fresh fruit juice quickly and automatically.

BACKGROUND OF THE INVENTION

Traditional juicers are instruments or tools that were designed to extract juice of citrus fruits, such as oranges, lemons, grapefruit, etc. The traditional way is carried out by simple steps that include cutting the fruit and then pressing the halves of it by hand on very simple manual juicers (plastic material, glass, metal, etc.), such as the known ones "fruit citrus juicers", as well as the use of more complex electric juicers to perform the operation by squeezing the fruit in a more or less automatic way.

This type of juicers is usually used in homes or for semi-commercial use in small juice businesses.

However, because the consumption of citrus fruits has been increasing every day, for example, for sale in shopping centers, restaurants and many bars and hotels to produce juice (fresh juice), automatic or semi-automatic machines began to be manufactured, which have a channel where citrus are placed and progressively progressing to a section of cut and squeezed according to customer orders.

Currently, there is a wide variety of citrus juicers. There are large ones such as the one developed by the company "FMC Technologies" protected by several U.S. patents, such as the U.S. Pat. Nos. 6,426,107B1; 6,568,319B2; 6,912,951 B2; 6,923,112B2, 7,421,945B2; 7,487,721B2, among others.

The operating principle of the FMC juicer is based on feeding the fruit to the juicer through a belt conveyor and is automatically positioned on a lower cup. A stainless steel blade located at the top, cuts a circle of bark on top of the citrus to allow separation of the crust from the interior portions of the fruit. In the lower part, another blade cuts a portion of bark to allow access of a cylinder to sift into the interior of the fruit. An upper cup moves down causing a pressure on the citrus so that the upper and lower blades begin to cut the upper and lower ends of the fruit. The design of the cups allows the fruit is perfectly subject, preventing breakage, and get a uniform extraction throughout the process. A pre-shaping cylinder separates the internal elements of the fruit according to their size: the juice and the pulp will pass through the holes of the pre-shaping cylinder and will be deposited in a juice reservoir, while the membranes and seeds will be discharged by a lower tube.

Once the extraction is finished, the interior portions of the citrus that are located inside the sifting cylinder and a tube moves upward, pressing the contents of the sifting cylinder, which causes the juice and pulp to pass through the sieve holes and into the juice collecting tank.

Another type of citrus fruit juicing machine is shown in U.S. Pat. No. 7,493,851 assigned to the company Zumex. Said squeezing machine is of a small size, of the type that uses sets of rotating male-female drums characterized by having one sole female drum and one sole male drum with an automatically positioning blade and a retaining pendulum-turning device. These characteristics avoid having to incorporate a second set of drums into the machine since the remaining half fruit is turned after the cut into the following upper cavity of the female drum. Its principle of operation is quite simple and is based on splitting the fruit in half and passing the halves between two rotating cylinders that press the fruit and extract the juice. The male and female drums with a perfect synchronization, extract the juice from the pulp of the fruit, which has previously been cut in two halves by means of the blade located in the upper compartment of the machine.

Both extractors present a very good efficiency for the ranges of recommended fruit sizes. However, losses in the yields of juice and essential oil can occur due to the breakage of the fruits when the pieces that are fed to a certain cup are too large or small. This problem is reduced by the selection by calibrating the size of the fruit suitable before extraction.

Another disadvantage is that the machines are large and occupy a larger storage space, as well as the high cost of the same, A further disadvantage of large juice extractors is that, due to the large number of pieces, it requires a greater cleaning to keep it in a healthy and hygienic condition.

Another type of machine for extracting juices is described in the U.S. Pat. No. 8,261,659 assigned to Carlos Mendes Neto, which generally refers to a fruit juice extraction device comprising two pairs of opposing peeler cups, for peeling fruits, which compress the fruit to obtain the juice, and particularly to features of the paired peeler cups that are effective at relatively higher production rates and/or with relatively smaller fruit.

As described above, most machines for the zumo or juice extraction are operated in an automatic or semi-automatic way, where the fruit is crushed or cut causing in some cases that the juice has a bitter taste, which is not pleasant for the consumer.

Therefore, the present invention relates to a citrus fruit juicer apparatus of the type comprising: a hollow housing having an open upper section and a lower exit section, said hollow housing including at least one opening or window for each one of its sides. A squeezer device coupled to the internal part of said hollow housing, the squeezer device having at least two trapezoidal sunken sections, each sunken section having an open top and a front section, the trapezoidal sunken sections being placed in an opposite relation to one another in the central part of the squeezing device, the front part of each trapezoidal sunken section being coincident with each opening of the hollow housing; the sunken trapezoidal sections including a plurality of slots to allow the passage of the citrus juice to be squeezed. At least one cutting blade placed transversely in the open upper section of the hollow housing, the blades being coupled above the squeezing device for reception and cutting of the citrus fruits. And, a pressing mechanism, which is placed, separately, above the hollow housing, said pressing mechanism including at least two pressing ladles which are located in an axial alignment with respect to each of the trapezoidal sunken sections of the squeezer device, the pressing mechanism being operable with a forward or backward movement so that once a citrus has been placed on the blades, the mechanism has a forward movement and the pressing ladles press the citrus on the cutting blades for cutting the citrus in parts and continue to enter each of the trapezoidal sunken sections of the squeezing device, said pressing ladles, during the forward movement press the cut sections of the citrus against the trapezoidal sunken sections, passing the citrus juice squeezed through the plurality of slots of the squeezed device and eject it to the lower section of the hollow housing; and, during its backward movement, separate the pressing mechanism and ladles from the hollow housing to allow the feeding of another citrus on the blades in the upper part of the hollow housing.

OBJECTIVES OF THE INVENTION

It is therefore a first objective of the present invention to provide a citrus fruit juice extractor such as oranges, lemons, grapefruits, etc., which allows cutting citrus fruits in at least two parts, squeezing them and releasing the peels, after the action of squeezing.

It is another objective of the present invention to provide a citrus fruit juice extractor that allows more juice to be extracted from each piece of citrus.

A further objective of the present invention is to provide a citrus fruit juice extractor that includes a pressure head for squeezing citrus fruits with metal ladles, which are interchangeable for each type and size of citrus.

It is yet another additional object of the present invention to provide a citrus fruit juice extractor having removable parts, making it highly hygienic and easy to clean.

A further objective of the present invention is to provide a citrus fruit juice extractor that produces juices free of acidity and contamination.

It is another object of the present invention to provide a citrus fruit juice extractor that is easy and simple to maintain.

These and other objects and advantages of the citrus juicer juice extractor of the present invention, may be visualized by those skilled in the art, of the following detailed description of the preferred embodiments of the invention, which will be within the scope of the claimed invention.

DETAILED DESCRIPTION OF THE INVENTION

Figure 1:
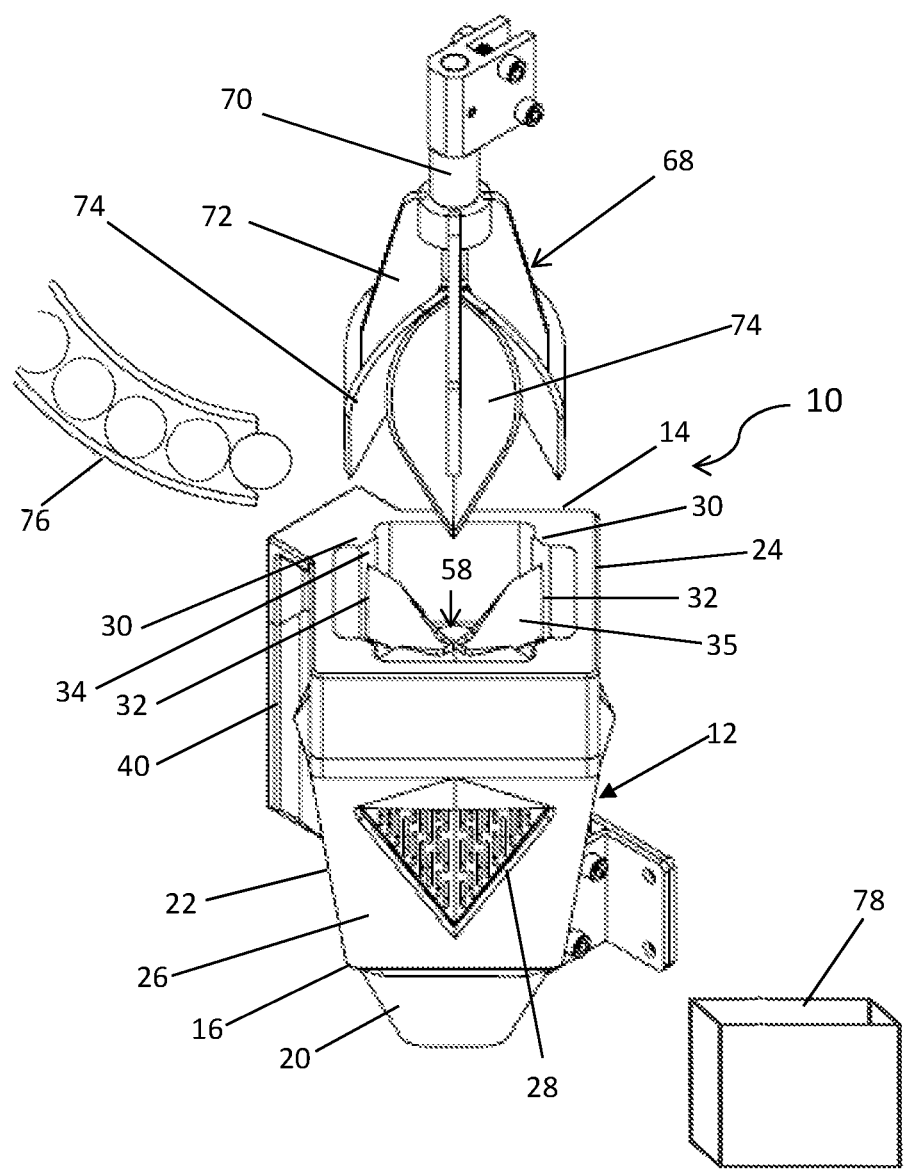
FIG. 1 is a conventional perspective view of the citrus fruit juice extractor of the present invention, in a separate position for performing the squeezing operation.
Figure 2:
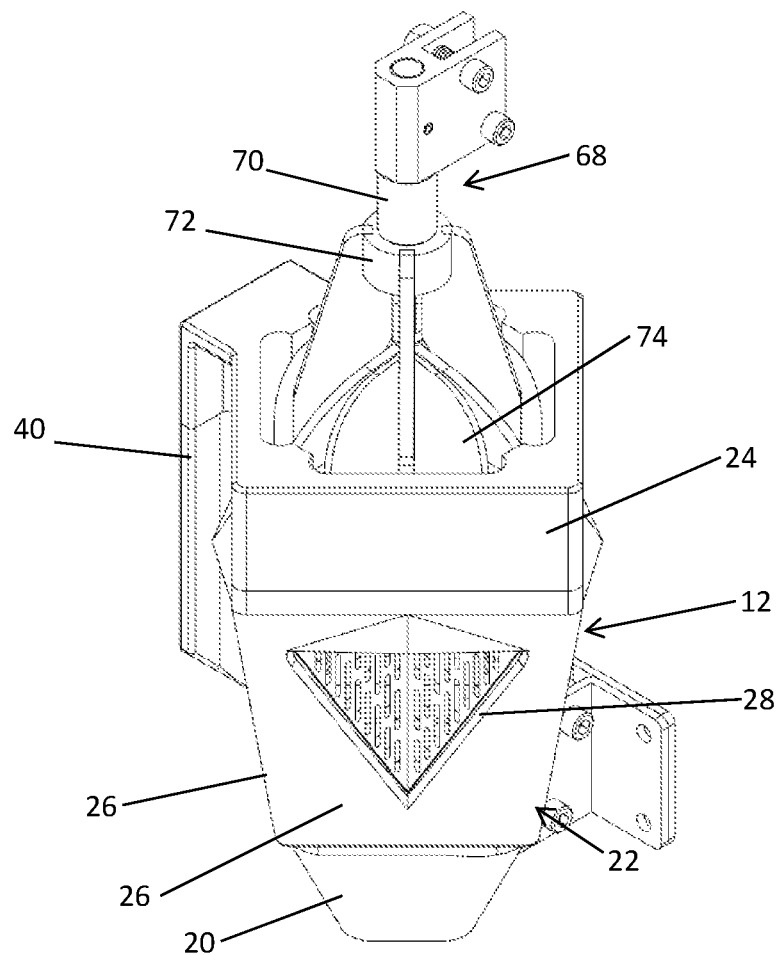
FIG. 2 is a conventional perspective view of the citrus fruit juice extractor of the present invention, in a squeezing position.
Figure 3:
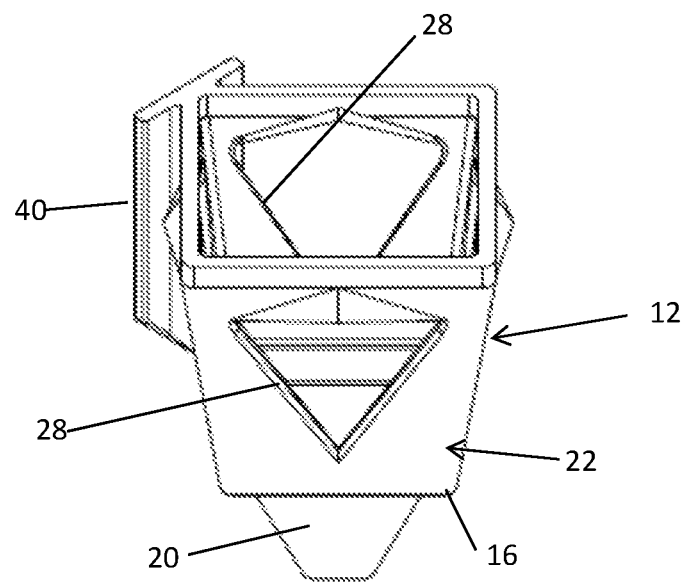
FIG. 3 is a perspective view of the hollow housing of the juice extractor of the present invention.
Figure 4:
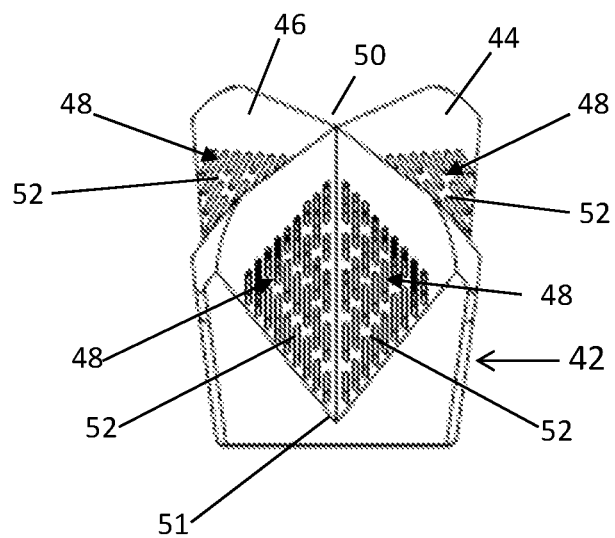
FIG. 4 is a perspective view of the squeezing device of the juice extractor of the present invention.

Referring now particularly to FIGS. 1 to 9, a citrus fruit juice extractor 10 is shown in a preferred embodiment of the present invention, comprising:

A hollow housing 12 having an upper end 14 and a lower end 16, the hollow housing 12 including a hollow tubular body 20, in the form of a truncated cone, forming a funnel. Said hollow tubular body 20 being placed below the lower end of the hollow housing 12, with its smaller radius facing downwards.

The hollow housing 12, in a first embodiment of the present invention, being quadrangular in shape, divided into two sections, a fixed lower section 22 and a removable section 24.

The fixed lower section 22 of the hollow housing 12 including, for each of its side faces 26, an opening or window 28, which may have the shape of an equilateral or isosceles triangle, or in diamond-shaped form, with its upper vertex facing downwards.

Figure 5A:
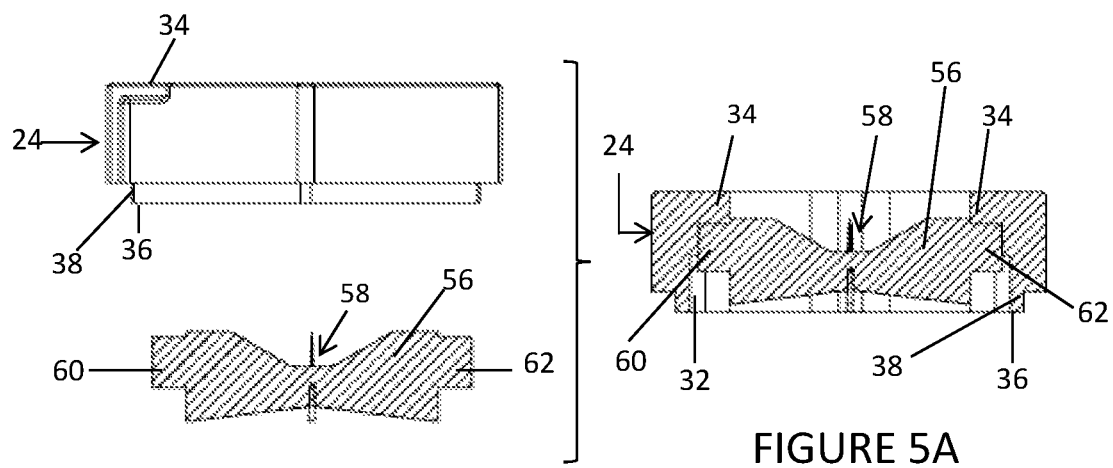
FIG. 5A is a detailed view of a section of FIG. 5, showing in detail the assembly of one of the parts of the citrus fruit juice extractor of the present invention.
Figure 5:
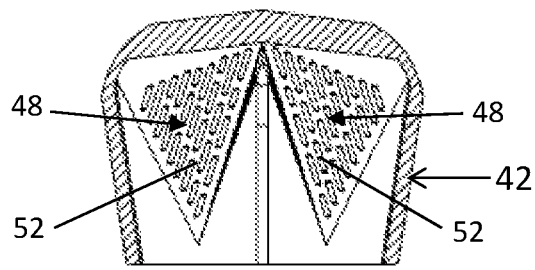
FIG. 5 is an exploded view of a section of the citrus fruit juice extractor of the present invention.
Figure 5:
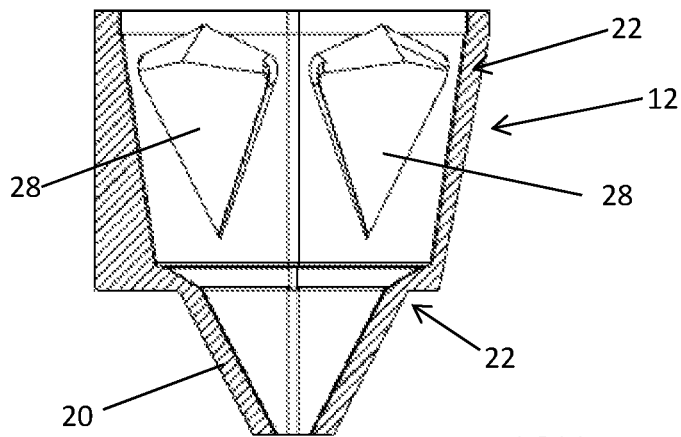

As for the removable section 24 of the hollow housing 12, it is also in squared shape (similar to a frame), which has formed on each of its vertices an inner corner 30, which includes a vertical slot 32 and an upper stop flange 34 located in the upper part of vertical slot 32, for retaining a plurality of blades 35, as will be described later. The lower part 36 of the separable frame or section 24 having a coupling flange 38 (FIGS. 5, 5A and 6), which, during its assembly with the fixed lower section 22 in the upper part of the hollow housing 12, is located by the inner part.

The hollow housing 12 including a retention bracket 40 to be fixed to any type of structure or wall (not shown).

Continuing with the description of the parts that make up the citrus fruit juice extractor 10 of the present invention, it includes a squeezer device 42 (FIG. 4) of quadrangular shape, having two internal walls 44, 46, which vertically divides the squeezer device 42 into four sections, located at 90° from each other, forming two vertices joining diagonally at the top. The inner walls 44, 46, having an upper end-to-end curvature.

The squeezer device 42 includes four trapezoidal sunks sections 48, or in triangular or diamond-shaped form, which are formed from the diagonal crossing or intersection of the inner walls 44, 46, which project, from the inside out, from the central part upper 50, each inner wall 44, 46, towards a lower section 51, in coincidence with the periphery of the squeezer device, with its vertex oriented downwards. The trapezoidal sunks sections 48 including a plurality of openings or grooves 52 to allow extraction of citrus juice. The four trapezoidal sucks 48, coinciding, during assembly, with the periphery of the openings or windows 28 of the fixed part 22 of the hollow housing 12.

Referring now to the plurality of blades 35 (FIGS. 8 and 9), these consist of a pair of blades 54, 56, in vertical position, which are mounted in the form of a cross, resulting in four metal sheets each located at 90°. This assembly has a low relief or convex section 58, in the central part of the blades 54, 56, which allows self-centering the citrus to be cut.

The ends 60, 62, and 64, 66, of the pair of blades 54, 56, are inserted in the vertical grooves 32 of each inner corner 30 of the separable frame or section 24, to completely secure the blades 35. The upper stop flange 34 located in the upper part of the vertical groove 32, prevents the plurality of blades 35 from coming out of their position. The arrangement of the blades 54, 56, in vertical position, being aligned on the upper part with each of the internal walls 44, 46, of the squeezer device 42.

And, finally, the citrus fruit juice extractor 10 includes a pressing device 68, which is located by the upper part of the hollow housing 32. Said pressing device 68 moves with a forward or backward movement or upward or downward movement, in such a way that, during its downward movement it presses the fruit (citrus) against the plurality of blades 35, cutting the fruit into four sections and, simultaneously press the cut sections of the fruit against the trapezoidal sunks sections 48 of the squeezer device 42, to extract the juice. The pressing device 68 comprises a shaft 70, which is connected to a motor (not shown), to generate an upward or downward movement. A head 72 housed at the lower end of the shaft 70, which includes four metal ladles 74, similar in form to a triangular trowel, placed with their faces facing one another. Said metal ladles 74 being aligned respectively with the four trapezoidal sunks sections 48 of the squeezer device 42.

As can be seen from the above, the assembly of the citrus fruit juice extractor 10 (FIG. 5) consists of: providing a hollow housing 32, with its openings or windows 28. Then, the squeezer device 42 is coupled in the internal part of the hollow housing 12 making the four trapezoidal suks sections 48 coincide with the openings or windows 28 of the fixed part 22 of the hollow housing 12.

Figure 6:
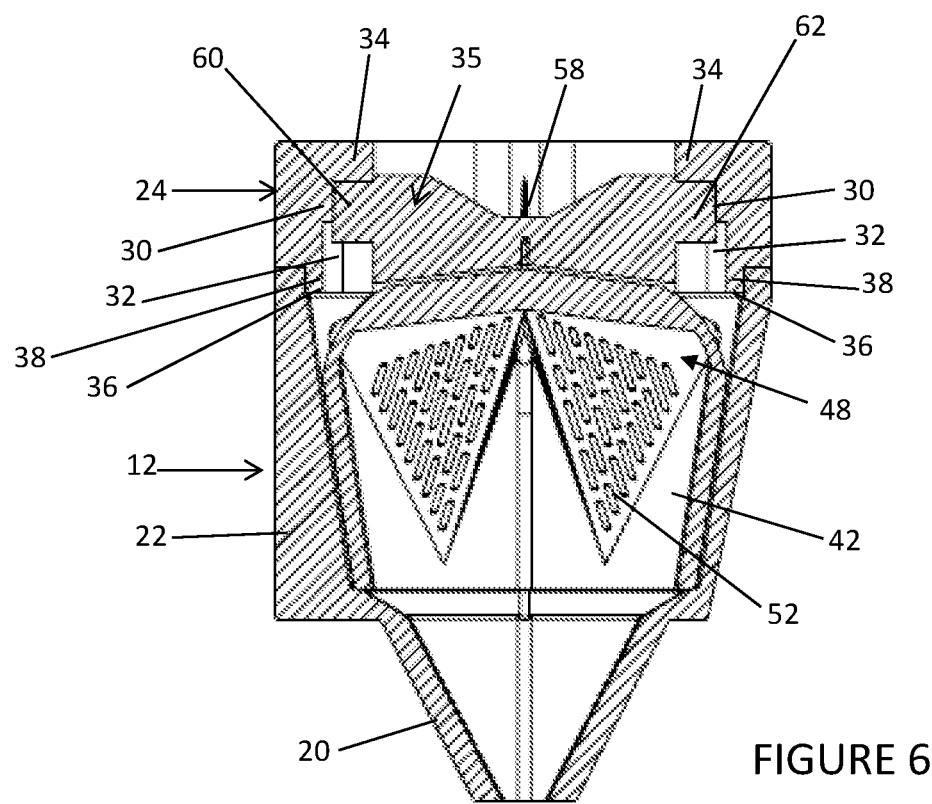
FIG. 6 is a sectional view of the assembly of the citrus fruit juice extractor shown in FIG. 5.
Figure 7:
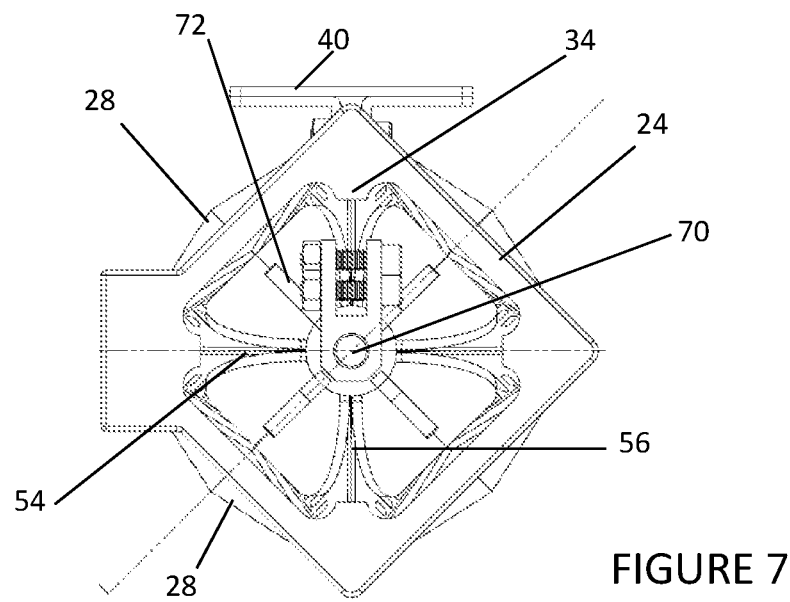
FIG. 7 is a plan view, showing the upper part of the hollow housing of the citrus fruit juice extractor of the present invention.
Figure 8:
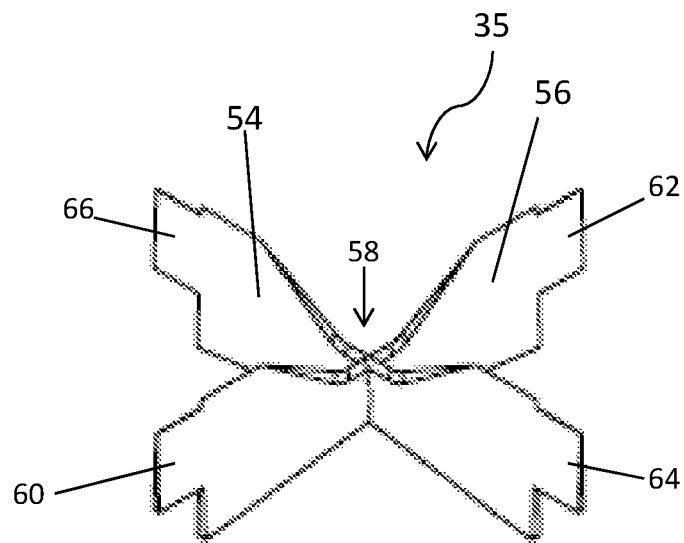
FIG. 8 is a perspective view of the cutting blades of the citrus fruit juice extractor of the present invention; and, FIG. 9 is a side view taken from FIG. 8 of the cutting blades of the citrus fruit juice extractor of the present invention
Figure 9:
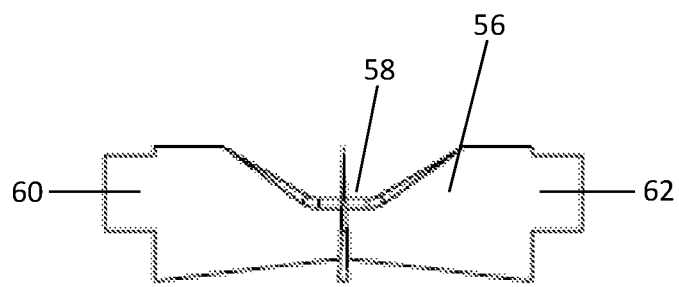

Separately (FIG. 5A), blades 54, 56 are engaged in the vertical grooves 32 of each inner corner 30 of the removable frame or section 24, to fully secure the plurality of blades 35. Once assembled, the removable frame or section 24 is assembled to the upper part of the hollow housing 12 (FIG. 6).

Once the upper part 14 and the lower part 16 of the hollow housing 12, the squeezer device 42 and the plurality of kives 35 have been assembled, this can be fixed to any type of structure or wall (not shown) for fastening.

The apparatus 10 is complemented by a pressing device 68, which is located at the top of the hollow housing 12. Said pressing device 68 being disposable with a forward or backward movement or upward or downward movement.

DESCRIPTION OF OPERATION

According to the arrangement of the citrus juice extractor 10 described above, the operation of the apparatus is as follows:

When the pressing device 68 is in its upper position (top), a citrus feeder 76 feeds the citrus to the upper part of the hollow housing 12 and is positioned in the low relief section or convex section 58, in the central area of the blades 35, which allows self-centering the citrus to be cut.

Once the citrus has been fed, the pressing device 68 moves downwards and its four metallic ladles 74, each in the form of a triangular trowel, push the citrus against the blades 35, until cutting it into four parts. Due to the movement of the pressing device 68 downwards, the metallic ladles 74 are inserted towards and in coincidence with the four trapezoidal sunks sections 48, of the squeezer device 42. The freshly cut citrus parts are squeezed against the walls of said four trapezoidal sunks sections 48, passing the juice through the plurality of openings or grooves 52. The extracted juice passes to the inner part of the hollow housing 12 and exits through the hollow tubular body 20, in the form of a funnel.

Once the squeezing step has been carried out, the pressing device 68 has an upward or retracting movement and, at this time, the shells that have been pressed against the walls of said four trapezoidal suks sections 48, are released. The shells are collected in containers 78 that are coupled by each of the openings or windows 28 of each of the side portions 26 of the hollow housing 12.

Upon raising the pressing device 68, a predetermined height of the hollow housing 12 is separated, enough to allow the feeding of another citrus to the upper part of said hollow housing 12.

From the above, even though one embodiment of the present invention has been described on the basis of four simultaneous cuts, it can be understood that the hollow housing 12 can be configured from two or more cuts, including a single blade 54 or 56, for cutting the fruit in two halves. In the case of a embodiment for two cuts, said hollow housing 12 would include only two windows or openings 28, which could be located on the side faces 26, in an opposite position facing each other. In the same way, the squeezer device 42 would include only two trapezoidal sunks sections 48 and, the pressing device 68, would have two metallic ladles or trowels 74 aligned with the two trapezoidal sunks sections 48 of the squeezer device 42.

Notwithstanding that in the foregoing reference has been made to two specific embodiments of citrus fruit juice extractor, it may be configured in other ways and it will be evident to experts in the field that may make some other changes, which would be included within of the spirit and scope of the present invention which is claimed in the following claims.

We claim:

1. A citrus fruit juicer extractor of the type comprising:
    a hollow housing having an open upper section and a lower exit section, said hollow housing including at least an opening for each side of the housing;
    a squeezing device coupled in the internal part of said hollow housing, said squeezing device having at least one internal wall for vertically dividing the squeezing device in at least two sections; at least one sunken section formed from or at the intersection of each of the internal walls, said sunken section being projected from the inside outwardly, from an upper section of each internal wall to a lower section in coincidence with the periphery of the squeezing element, said sunken section being coincident during their assembly, with the periphery of the openings of the hollow housing; and, a plurality of grooves for each sunken section to allow the passage of the juice of the citrus to be squeezed;
    at least one cutting element placed transversely in the open upper section of the hollow housing, said cutting element being coupled above the squeezing device for the reception and cutting of the citrus fruits; and,
    pressing means, said pressing means being located separately and above the hollow housing, said pressing means including at least two pressing elements which are located in an axial alignment with respect to each of the sunken sections of the squeezing device, said pressing means being operable with a forward or backward movement in such a way that, during its forward movement, said pressing means press the citrus on the cutting elements by cutting the citrus in parts and introducing them to each one of the sunken sections of the squeezing device, said pressing elements pressing the cut sections of the citrus against said sunken sections of the squeezing device, passing the citrus juice through the plurality of openings and expelling it through the lower section of the hollow housing; and, during its backward movement, separating said pressing means from the hollow housing to allow the feeding of another citrus on the cutting element in the upper section of the hollow housing.

2. The citrus fruit juicer extractor as claimed in claim 1, further comprising a citrus feeder for supplying citrus fruits to the upper section of the hollow housing and above the cutting elements.

3. The citrus fruit juicer extractor as claimed in claim 1, further comprising a container collected by each of the openings of the hollow housing, to collect the shells of the cut citrus.

4. The citrus fruit juicer extractor as claimed in claim 1, wherein the cutting elements are aligned vertically and located above each of the internal walls of the squeezing device.

5. The citrus fruit juicer extractor as claimed in claim 1, wherein the open upper section of the hollow housing comprises at least one corner section, on the inside, said corner including a vertical slot and an upper stop flange for retention of the cutting elements.

6. The citrus fruit juicer extractor as claimed in claim 1, wherein the lower exit section is in the form of a truncated cone.

7. The citrus fruit juicer extractor as claimed in claim 1, wherein the hollow housing includes at least one retaining support to be fixed to any type of structure or wall.

8. The citrus fruit juicer extractor as claimed in claim 1, wherein the openings of the hollow housing are triangular or diamond-shaped.

9. The citrus fruit juicer extractor as claimed in claim 1, wherein the internal walls of the squeezing device are mounted crosswise.

10. The citrus fruit juicer extractor as claimed in claim 3, wherein the squeezing device is square shape.

11. The citrus fruit juicer extractor as claim in claim 3, wherein the sunken sections are trapezoidal, triangular or diamond-shaped.

12. The citrus fruit juicer extractor as claimed in claim 1, wherein the cutting element is at least one blade, said blade having a low relief or convex section in the central part to self-center the citrus before cutting.

13. The citrus fruit juicer extractor as claimed in claim claim 12, wherein the blades are mounted in a cross located at 90° to each other.

14. The citrus fruit juicer extractor as claimed in claim 1, wherein the pressing means comprises:
 a shaft, said shaft having an upper end and a lower end;
 transmission means mounted to an upper end of the shaft to generate a forward or backward movement to said shaft; and,
 a head coupled to the lower end of the shaft, said head comprising said pressing elements.

15. The citrus fruit juicer extractor as claimed in claim 1, wherein the pressing elements are in the form of a triangular trowel or ladles, which is adaptable to the shape of the citrus.

16. The citrus fruit juicer extractor as claimed in claim 15, wherein the trowel or ladles are placed with their faces coinciding one in a relation one in front of the other.

* * * * *